(12) United States Patent
Piran

(10) Patent No.: US 11,359,063 B2
(45) Date of Patent: Jun. 14, 2022

(54) MITIGATION OF MINERAL OIL MIGRATION IN PRESSURE-SENSITIVE LABELS AND FILMS

(71) Applicant: Jindal Films Americas LLC, LaGrange, GA (US)

(72) Inventor: David Piran, Saint-Laurent-sur-Othain (FR)

(73) Assignee: Jindal Innovation Center Sri, Virton (BE)

(*) Notice: Subject to any disclaimer, the term of this patent is extended or adjusted under 35 U.S.C. 154(b) by 191 days.

(21) Appl. No.: 16/671,393

(22) Filed: Nov. 1, 2019

(65) Prior Publication Data

US 2020/0061968 A1    Feb. 27, 2020

Related U.S. Application Data

(63) Continuation of application No. PCT/US2019/029023, filed on Apr. 25, 2019.
(Continued)

(51) Int. Cl.
*C08J 7/043* (2020.01)
*C09J 7/24* (2018.01)
(Continued)

(52) U.S. Cl.
CPC .............. *C08J 7/043* (2020.01); *B32B 7/12* (2013.01); *B32B 27/306* (2013.01); *B32B 27/32* (2013.01);
(Continued)

(58) Field of Classification Search
CPC ..... C08J 7/043; C08J 7/243; C08J 7/35; C08J 7/50; C08J 2423/106; C08J 2429/003;
(Continued)

(56) References Cited

U.S. PATENT DOCUMENTS 5,698,333 A    12/1997 Ambroise et al.
9,133,369 B2 *  9/2015 Gringoire .......... C09J 123/0876
(Continued)

FOREIGN PATENT DOCUMENTS

WO    WO2016/131054    * 8/2016 ............. B32B 27/08
WO    WO-2016131054 A1 * 8/2016 ............. C08J 7/042

OTHER PUBLICATIONS

Agnes Wittman-Regis, IPER on PCT/US 19129023, Nov. 24, 2020, WIPO, Geneva, CH.
(Continued)

*Primary Examiner* — Michael C Miggins
(74) *Attorney, Agent, or Firm* — Rao Deboer Osterrieder, PLLC; Erik J. Osterrieder

(57) ABSTRACT

Disclosed are hot-melt, curl-free methods, structures, and compositions, which in flexible packaging applications, reduce mineral-oil, hydrocarbon migration into packaged food. One embodiment provides an optionally oriented base film having a first side and a second side that is a transparent or opaque film. Further, the composition comprises, consists essentially of, or consists of a water-based primer applied to the first side. Further still, the composition includes a barrier layer to mineral-oil migration, wherein the barrier layer is located between the adhesive-receptive layer and the polymeric substrate, and wherein the barrier layer consists essentially of: (i) polymers of polyvinyl alcohol, ethylene vinyl alcohol, polyester, polyamide, or combinations thereof; and (ii) optionally additives. The barrier layer provides a barrier to mineral-oil migration of 0.1 µg/day*dm² or less at 40° C. for 40 days, and the curl-resistant composition does not curl when heated for at least one hour at 60° C.

19 Claims, 1 Drawing Sheet

CURL TENDENCY COMPARISON BETWEEN STANDARD FILM (ON RIGHT) AND A VERSION MODIFIED WITH POLYESTER PRIMER (ON LEFT)

Related U.S. Application Data

(60) Provisional application No. 62/675,019, filed on May 22, 2018.

(51) Int. Cl.
| | | |
|---|---|---|
| *C09J 7/35* | (2018.01) | |
| *C09J 7/50* | (2018.01) | |
| *B32B 7/12* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |

(52) U.S. Cl.
CPC ............ *B32B 27/34* (2013.01); *B32B 27/36* (2013.01); *C09J 7/243* (2018.01); *C09J 7/35* (2018.01); *C09J 7/50* (2018.01); *B32B 2250/24* (2013.01); *B32B 2255/10* (2013.01); *B32B 2255/26* (2013.01); *B32B 2307/518* (2013.01); *B32B 2307/7265* (2013.01); *B32B 2519/00* (2013.01); *C09J 2423/106* (2013.01); *C09J 2429/003* (2013.01); *C09J 2467/003* (2013.01); *C09J 2477/003* (2013.01)

(58) Field of Classification Search
CPC . C08J 2467/003; C08J 2477/003; B32B 7/12; B32B 27/306; B32B 27/32; B32B 27/34; B32B 27/36; B32B 2250/24; B32B 2255/10; B32B 2255/26; B32B 2307/518; B32B 2307/7265; B32B 2519/00
See application file for complete search history.

(56) References Cited

U.S. PATENT DOCUMENTS

| | | |
|---|---|---|
| 9,636,895 B2 | 5/2017 | Blackwell et al. |
| 2012/0282447 A1 | 11/2012 | Gringoire et al. |
| 2015/0147548 A1* | 5/2015 | Mauser ................ B32B 27/10 428/220 |
| 2016/0122116 A1* | 5/2016 | Branyon ............... B65D 5/563 206/524.2 |
| 2018/0370199 A1* | 12/2018 | Dabadie ................ B32B 27/08 |

OTHER PUBLICATIONS

Lee W. Young, International Search Report on PCT/US19/29023, dated Jul. 30, 2019, USPTO, Alexandria, VA.

* cited by examiner

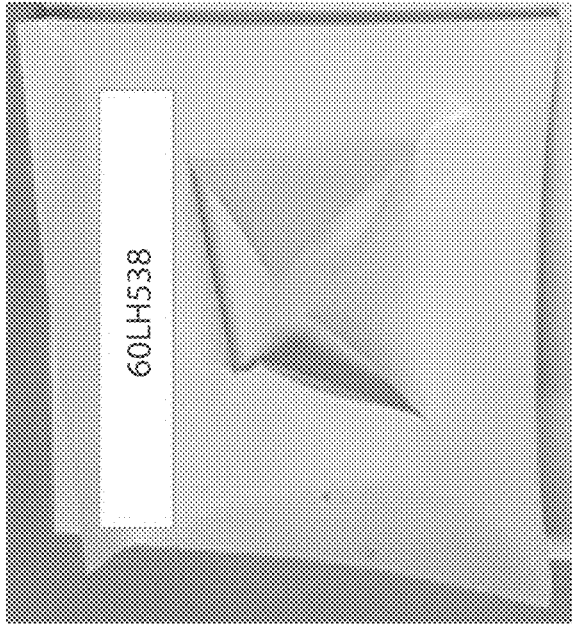
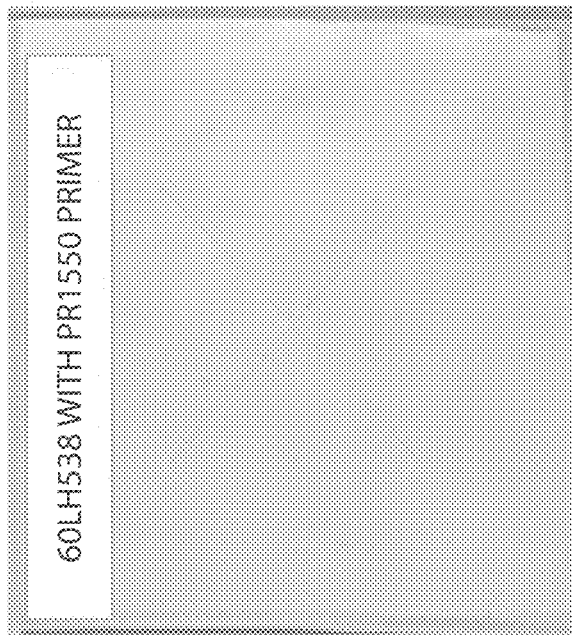
CURL TENDENCY COMPARISON BETWEEN STANDARD FILM (ON RIGHT) AND A VERSION MODIFIED WITH POLYESTER PRIMER (ON LEFT)

MITIGATION OF MINERAL OIL MIGRATION IN PRESSURE-SENSITIVE LABELS AND FILMS

REFERENCE TO RELATED APPLICATIONS

This application is a Patent Cooperation Treaty application, which claims priority to U.S. provisional patent application Ser. No. 62/675,019 filed on 22 May 2018 that is hereby incorporated by this reference in its entirety.

FIELD

The disclosure generally relates to compositions, structures, methods for films, which include labels among other types of films, with improved levels of mitigating, including, in some embodiments, to the point of preventing or essentially preventing mineral-oil migration in pressure-sensitive labeling and flexible packaging applications.

BACKGROUND

Mineral oil hydrocarbons ("MOH") may be found in nature and in the environment. There are various known sources of mineral oil hydrocarbons, such as from crude oil, but also, they are produced synthetically from coal, natural gas and biomass. MOH are generally complex mixtures of different hydrocarbon molecules often derived from crude oil, but they are derivable from coal, natural gas or biomass as well. These mineral oils are generally composed of mineral-oil, saturated hydrocarbons ("MOSH"), which are open-chain hydrocarbons (paraffins) and cyclic, saturated hydrocarbons commonly called naphthenes. Polyolefinic, oligomeric, saturated hydrocarbons ("POSH"), which are similar to MOSH, are of synthetic origin and consists of polyolefinic (e.g., polypropylene or polyethylene) oligomers. The majority portion, i.e., >50 wt. %, of MOH is generally composed of MOSH fractions; any MOSH portion results generally do not exceed 25 to 35 wt. %.

In the flexible packaging and labeling industries, MOH may be responsible for at least two different issues. Firstly, MOH may migrate into food through migration processes (e.g., from the packaging itself) or via gas-phase evaporation and condensation. Some MOSH are known to accumulate in different human tissues and cause microgranulomas. MOAH are probably the most-problematic fractions of MOH because they are suspected to be carcinogenic and mutagenic.

There is, therefore, a market interest and/or need to have specific film compositions and structures for flexible packaging that would prevent or significantly reduce the migration of mineral oils from the environment, e.g., air, packaging, and/or cardboards, into the food.

The second issue regarding MOH relates to the pressure-sensitive-label(s) ("PSL") industry. Three major types of adhesives in PSL include hot-melt, solvent-based and water-based adhesives. Hot-melt coating is the fastest-growing adhesive system used in the pressure-sensitive adhesive ("PSA") industry. PSA, self-adhesive, or self-stick adhesive is an adhesive, which forms bond when pressure is applied to unite the adhesive with the adherend. These PSA are not considered adhesives as they are "activable" by heat, solvent, water, or combination thereof.

In hot-melt scenarios, PSAs may have a high coating weight, such as 50 g/m$^2$ in applications like polyethylene ("PE") oil drums, rough surfaces, or labels that need to adhere for long periods. When oriented polypropylene ("OPP") films in PSL applications are used with hot-melt PSAs, OPP films generally exhibit a behavior of curling and swelling. This behavior, without being bound to this theory, is believed to be due to migratory additives in the hot-melt (including mineral oils) that permeate into the OPP film and cause the swelling and curling. Consequently, this behavior sometimes results in de-labeling.

De-labeling or other weakening in labeling adhesion may be critical in some applications, e.g., where heavy hot-melt layers have to be applied to give good adhesion, but which then result in a curling effect that weakens the adhesive bond, or when a label is applied to warm containers. Swelling/curling depends on both the quantity of hot melt and the time of contact with the support. Temperature is also a critical parameter. Specific migratory-additive-free, hot-melt PSLs do exist, but such make the label more expensive. Some specific films structures for labeling applications have been developed by David Piran et al. in WO/2016/131054. However, there remains a need for compositions, structures and methods that are fit-for-use in terms of adhesive adhesion with various types of adhesives. The wide range of adhesives used in PSL applications does not only include hot melts, but also includes water- and solvent-based adhesives. There is, therefore, a market interest and/or need to have specific curl-free or reduced-curl products and methods that also work with a wide range of standard hot-melt, water- and solvent-based adhesives. In addition, a film compliant with food-safety regulations is also a breakthrough.

SUMMARY

Disclosed are hot-melt, curl-free methods, structures, and compositions, which in flexible packaging applications, reduce mineral-oil, hydrocarbon migration into packaged food. One embodiment provides an optionally oriented base film having a first side and a second side that is a transparent or opaque film. Further, the composition comprises, consists essentially of, or consists of a water-based primer applied to the first side. Further still, the composition includes a barrier layer to mineral-oil migration, wherein the barrier layer is located between the adhesive-receptive layer and the polymeric substrate, and wherein the barrier layer consists essentially of: (i) polymers of polyvinyl alcohol, ethylene vinyl alcohol, polyester, polyamide, or combinations thereof; and (ii) optionally additives. The barrier layer provides a barrier to mineral-oil migration of 0.1 µg/day*dm$^2$ or less at 40° C. for 40 days, and the curl-resistant composition does not curl when heated for at least one hour at 60° C. The composition provides outstanding printability, adhesive adhesion with hot melts, water- and solvent-based adhesives.

DETAILED DESCRIPTION

This disclosure generally relates to methods, applications, compositions, structures, labels, and so forth associated with mitigating, in some embodiments, to the point of preventing or essentially preventing mineral-oil migration in pressure-sensitive labeling and flexible packaging applications.

Film structures in this disclosure may be clear, whitish, or white opaque, and may have a barrier to migratory additives, including mineral oils from hot-melt adhesives, in order to ensure that the film remains free or essentially free from swelling and curling.

Film structures that may be clear, whitish or white-opaque may have a barrier to mineral oils from various sources that prevents or reduces the migration of these chemical species into packaged food.

Pressure-Sensitive Label Film Structures

Not limited to barrier coatings with hot-melt additives, this disclosure discloses a unique label structure that combines enhanced printability on one side with various printing technologies, including, e.g., and without limitation, ultraviolet ("UV") flexo, UV-offset, UV-letter press, hot/cold foil stamping, thermal transfer, UV ink jet, combinations thereof, and so forth, along with remarkable hot-melt, adhesive adhesions combined with a barrier effect that prevents the label from swelling and curling when hot melts are used. In addition, the unique label structure has outstanding performances when water- or solvent-based adhesives are used.

The disclosed compositions, structures, labels, and so forth comply with the legal requirements or recommendations in the EU-framework regulations on materials and articles intended for food contact, including Reg (EC) No 1935/2004, as well as good manufacturing practices for materials and articles intended for food contact, including Reg. (EC) 2023/2006.

The film structures in David Piran, et al. in WO/2016/131054 A1 are found to efficiently resist swelling and curl when hot-melt adhesives are used. However, the surface functionalities of the backside coating (i.e., adhesive receptive layer) was not designed to provide high-adhesive, adhesion values. As a consequence, in some cases, and more specifically in repositionable and removable applications, poor adhesive behavior may exist upon label removal from a container; that is, the adhesive does not stay totally on the label but is transferred to the container. The affinity of the hot-melt adhesive for the container becomes higher than the one for the label (adhesive failure). Furthermore, although the peel adhesion values are satisfactory in some cases, the adhesive receptive layer is not designed for water and solvent based adhesives and limits the applications field to hot-melt adhesives only.

Embodiments of the present disclosure may include modifications to the two-sided, coated, composite films and structures, such as PSLs, described, for example, by Bruno Gringoire, et al. in WO/2011/100029 A1. Such structures relate to printable, two-sided, coated polymer-based films and labels that are resistant to blocking while providing robust adherence to adhesives and resistance to moisture. Other examples of film structures and printable and/or adhesive receptive coatings at issue in the present invention may include modifications to the films and structures disclosed by Dennis McGee, et al. in WO/2007/130196 A1, Dennis McGee in U.S. Pat. No. 6,893,722 B2, and Bruno Gringoire, et al. in WO/2013/112239 A1. While these various films and structures provide outstanding printability and adhesive receptivity with different printing and adhesive technologies, they were neither designed nor provide curl-free applications. Accordingly, one idea discussed in this disclosure is to use the performances of the base film, i.e., (polymeric) substrate layer, with the printable and backside topcoats, but also integrate into the film structure a primer or a co-extruded layer preventing or reducing the migration of mineral oils or any other additives from the hot-melt adhesive into the film matrix so as to keep the film free or essentially free from swelling and curl. Table 1 is an example of such a film structure.

TABLE 1

Backside: Adhesive receptive layer
Curl-resistant primer
Base film (clear, cavitated or solid white base film)

TABLE 1-continued

Primer or No Primer
Printable Coating

The disclosed film structures combine printability, curl-resistance, improved antistatic and adhesive anchorage properties with hot melts, water- and solvent-based, permanent or removable adhesives, and comply with the European Food contact regulations. Several primer layers, optionally with additives, as barrier layers are considered. Instead of a primer layer, a coextruded layer to the base film was also considered, wherein the coextruded layer comprised, consisted essentially of, or consisted of ethylene vinyl alcohol, polyvinyl alcohol, polyester, or polyamide polymers, or combinations thereof and optionally additives to effect, for example, barrier to mineral-oil migration of 0.1 µg/day*dm$^2$ or less at 40° C. for 40 days, i.e., a limit also exhibited in embodiments alternatively using a primer comprising, consisting essentially of, or consisting of polymers of a polyolefin dispersion in optional combination with additives. Thereafter, the coextruded layer may be coated with coatings for various purposes, e.g., additional barrier layers, printable coatings, etc.

One example of modified film grade that is modifiable as disclosed in this disclosure is the 60LH538 made by Jindal Films. Primer barrier layers were tested under the backside adhesive receptive coating. This approach allows combining curl-resistance with the incumbent properties of the 60LH538 film.

Film Structure

The disclosed film design for hot-melt, curl-free applications offers an adhesive-receptive layer with specific surface properties that ensure a high level of adhesion for the hot-melt adhesive and unique properties in order to prevent the label from curling after hot-melt applications. Further, the disclosed film structure also works with water- and solvent-based adhesives. In addition, these remarkable properties are also combined with excellent printability properties on the base film's second side (i.e., non-adhesive side) with various inks and printing technologies, including, e.g., UV-flexo, UV offset, UV letter press, UV screen, hot/cold foil stamping, thermal transfer ribbon ("TTR") or UV inkjet. The base film's first side (i.e., adhesive side), and/or the second side, optionally may be printed with solvent-based inks. Furthermore, coatings on both sides of the film were designed and formulated to have affinity for their highly functionalized surfaces in order to avoid tendency of layers of the reels to stick against themselves and facilitate the unwinding of the reel at high speed. The advantage of similar structure is to keep the tailored-made topcoats' properties for printing and adhesive adhesion while integrating inside the structure, e.g., into a primer layer, a barrier coating that slows down or prevents excessive migration of mineral-oil hydrocarbons and other chemical species that would generate swelling and curl.

The topcoats, i.e., printable and adhesive receptive sides, may be applied by any means known in the art, such as direct gravure, reverse-direct gravure, offset, spraying, or dipping.

In this case, it is advantageous to apply a primer to one or both sides of the polymeric substrate layer ("substrate") before applying the topcoats because these additional layer(s) may increase the bonding between the base films and the coatings, but also because they can bring the desired properties in terms of barrier to mineral oils and curl/swelling resistance.

Any primer layer commonly used in the art could be used and included in films according to this invention, even though the chosen primer should bond adequately to the polymeric substrate and coating formulation when exposed to conditions of intended use, such as exposure to hot water. Exemplary primers may include water-based epoxies prepared and applied according to Steiner, et al. in U.S. Pat. No. 4,214,039 and cationic amino-functional polymers described by McGee in U.S. Pat. No. 6,596,379. Other specific examples may include amino-functional acrylics such as NeoCryl™ XK-90 or water-based urethanes like NeoRez R-610, manufactured by DSM NeoResins (Waalwijk, The Netherlands). However, none of these primers, except water-based epoxies, will prevent migration of mineral oils and label-curling after some time. The water-based epoxies, however, incorporate significant amounts of volatile organic compounds and most of them are based on Bisphenol A ("BPA") type chemistries. These BPA-based components are more and more considered as potentially hazardous for human health and some countries, such as France, already refuse the use of packaging films containing such kind of chemicals. When used, primer layers should be relatively thin, with application levels yielding between about 0.05 g/m$^2$ and 1.0 g/m$^2$ of dried primer. A more preferred range for primers may be between 0.1 g/m$^2$ and 0.5 g/m$^2$.

In particular embodiments, the films according to the invention consist, consist essentially of, or comprise: a) a polymeric substrate including a first side and a second side; b) a backside coating formed from a water-based coating designed for outstanding adhesive adhesion properties, such as those described by Bruno Gringoire in WO/2011/100029, applied to the first side, c) a printable front-side layer in contact with the second side of the polymeric substrate, and d) a primer coating or extruded layer exhibiting barrier properties to MOH and generating curl resistance to the label, wherein the primer or extruded layer is applied between the backside coating and the second side. In further, optional embodiments, the same or a different primer may be applied between the printable front side layer and the second side.

Examples of specific primer layers used as barrier coatings to MOH may comprise, consist essentially of, or consist of polymers of polyvinyl alcohol, ethylene vinyl alcohol, polyester, polyamide, or combinations thereof, either in water- or solvent-based solutions or dispersions, optionally in combination with additives, to effect, for example, barrier to mineral-oil migration of 0.1 µg/day*dm$^2$ or less at 40° C. for 40 days or even 0.02 µg/day*dm$^2$ or less at 40° C. for 40 days or lower to some mineral oils.

In one specific embodiment, the polyester primer, LOCTITE LIOFOL PR 1550, is used as the primer layer. This polyester, water-based dispersion was originally designed for priming of aluminum foil and corona-treated films. Since polyester film is well known to prevent migration of mineral oils into polyolefin films, the idea here was to determine whether water-based dispersion of modified polyester components was also able to block or reduce the migration of chemical species like MOH or other ones contained in hot-melt adhesives that are responsible for curled/swelled labels.

Curl Resistance Evaluation Protocol: Criticality Increase

The test method involves applying an adhesive to a release liner, followed by transfer-coating the test adhesive to the adhesive-receiving, coated surface of the sample polymeric substrate to be evaluated. The adhesive coating weight is typically about 20±1 g/m$^2$ but 20 to 50 grams/m$^2$ of hot melt can be applied on the adhesive receptive side of the coated film from the transfer label stock. An A4 format label or a 10×10 cm piece of film is generally used in such a test protocol. The hot melt present at the surface of the label is "neutralized" with talc. The presence of the latter will allow easier handling of the samples and will avoid/mitigate sticking in an oven tray.

A cross-cut (90°) is made at the center of the label (16 cm×16 cm on A4 sheets or ~7 cm×7 cm on 10 cm×10 cm samples). Samples are then stored in a ventilated oven (e.g., 70% power) at 60° C. for 45 minutes. Curl behavior can be observed after respectively 3, 6, 10, 15, 30 and 45 minutes in the standard testing protocol. A few minutes are generally sufficient to observe curl when film structures without barrier layers to MOH are tested. Curl amplitude can be evaluated in mm in any direction or according to a scale from 0 to 5, where 0 means that the sample remained perfectly flat and 5 is means the sample swelled and curled significantly. 5+ means extreme film deformation/curl. In order to make the testing even more critical, the storage period in the oven may be increased up to 5 days. However, as a general rule, the results observed after 2 days does not vary anymore with time.

Curl-Resistance Evaluation: Preliminary Polyester ("PET") Primer Evaluation

Curl resistance was evaluated on samples produced on a coating line using reverse-direct gravure technology. The base film used was 60ZH247 from Jindal Films. 60ZH247 is a super-white, opaque, biaxially oriented polypropylene film with a density is 0.72 kg/dm$^3$. In typical embodiments such as here, it is a 5-layer structure with copolymer or terpolymer skins containing anti-blocking particles. With this base film, the same structure as grade 60LH538 (see Table 1) was produced, but the primer of the backside was replaced by a polyester dispersion from Henkel, i.e., LOCTITE LIOFOL PR 1550. The PET-primer-based structure was tested with and without a topcoat. The results summarized in Table 2 are comparing a standard 60LH538 with the same structure made with the PR1550 from Henkel on the backside primer layer (0.36 g/m$^2$) and a 60ZH247 (i.e., the same base film as the 60LH538) coated on one side with the same amount of polyester primer PR 1550 (0.36 g/m$^2$). While the standard grade 60LH538 already exhibits unacceptable level of curl after a few minutes in the oven at 60° C., the polyester-based version remains completely flat and show no evidence of swelling or curl.

TABLE 2

| Curl-Resistance Induced by Polyester Primer | | | |
|---|---|---|---|
| | 60LH538 | 60LH538 structure with PET primer | 60ZH247 structure with PET primer |
| Curl resistance at 60° C. and 45 min; Hot-melt S-2045 from Avery | 5 | 0 | 0 |
| Curl resistance at 60° C. and 45 min; Hot-melt TT4 from Manter | 5 | 0 | 0 |
| Curl resistance at 60° C. and 45 min; Hot-melt S-2045 from Avery | 5 | 0 | 0 |
| Curl resistance at 60° C. and 45 min; Hot-melt TT4 from Manter | 5 | 0 | 0 |
| Curl resistance at 60° C. and 45 min; Hot-melt S-2045 from Avery | 5 | 0 | 0 |
| Curl resistance at 60° C. and 45 min; Hot-melt TT4 from Manter | 5 | 0 | 0 |

FIG. 1 shows examples of samples after curl resistance test. Standard film for PSL applications (i.e., 60LH538, a Label-Lyte® oriented polypropylene film) clearly exhibits very high curl already after 45 minutes in the oven at 60° C. while the modified version remains completely flat even after 5 days in the oven.

New Curl-Resistance Evaluation with Various Types of Hot-Melt Adhesives

A new series of tests were performed with several different types of hot melt adhesives from various suppliers:

| | |
|---|---|
| Avery S-2045 | tire applications |
| Manter TT4 | general purpose hotmelt adhesive |
| UPM Raflatac RH1 | general purpose hotmelt adhesive |
| UPM Raflatac RH03 | deep-freeze adhesive (soft) |
| UPM Raflatac RH0T | tire adhesive (soft, highly resinated, high coat-weight) |
| Artimelt L1 945 | permanent/very strong bond |
| Artimelt L1 972 N | permanent/very strong bond |
| Artimelt L3 927 | repositionable/very low bond |

As shown in Table 3, PET-primer-based samples again showed outstanding curl resistance. The examples in Table 3 used 0.36 g/m² primer based on its dry weight. In any cases, PET-based sample did not show any curl or swelling tendency. Other investigations carried out in the framework of MOSH/MOAH barrier films for packaging applications (see below) revealed that the permeation rate of MOH simulants in coated BOPP films is significantly reduced when PET primer is used. The migration of mineral oil hydrocarbons from the hot melts into the base film is therefore clearly reduced by the polyester dispersion.

TABLE 3

Curl-Resistance Evaluation with Various Hot-Melt Adhesives

| | 60LH538 | 60LH538 structure with PET primer |
|---|---|---|
| Curl resistance at 60° C. and 1 h; hot-melt S-2045 from Avery | 3-4 | 0 |
| Curl resistance at 60° C. and 1 h; hot-melt TT4 from Manter | 3-4 | 0 |
| Curl resistance at 60° C. and 1 h; hot-melt RH1 from Raflatac | 1-3 | 0 |
| Curl resistance at 60° C. and 1 h; hot-melt RH3 from Raflatac | 5 | 0 |
| Curl resistance at 60° C. and 1 h; hot-melt RH0T from Raflatac | 3 | 0 |
| Curl resistance at 60° C. and 1 h; hot-melt L1 945 from Artimelt | 3-4 | 0 |
| Curl resistance at 60° C. and 1 h; hot-melt L1 972N from Artimelt | 3-4 | 0 |
| Curl resistance at 60° C. and 1 h; hot-melt L1 927 from Artimelt | 3-4 | 0 |
| Curl resistance at 60° C. and 24 h; hot-melt S-2045 from Avery | 5 | 0 |
| Curl resistance at 60° C. and 24 h; hot-melt TT4 from Manter | 5 | 0 |
| Curl resistance at 60° C. and 24 h; hot-melt RH1 from Raflatac | 5+ | 0 |
| Curl resistance at 60° C. and 24 h; hot-melt RH3 from Raflatac | 5 | 0 |
| Curl resistance at 60° C. and 24 h; hot-melt RH0T from Raflatac | 5 | 0 |
| Curl resistance at 60° C. and 24 h; hot-melt L1 945 from Artimelt | 5 | 0 |
| Curl resistance at 60° C. and 24 h; hot-melt L1 972N from Artimelt | 5 | 0 |
| Curl resistance at 60° C. and 24 h; hot-melt L1 927 from Artimelt | 5 | 0 |
| Curl resistance at 60° C. and 2 d; hot-melt S-2045 from Avery | 5 | 0 |
| Curl resistance at 60° C. and 2 d; hot-melt TT4 from Manter | 5 | 0 |
| Curl resistance at 60° C. and 2 d; hot-melt RH1 from Raflatac | 5+ | 0 |
| Curl resistance at 60° C. and 2 d; hot-melt RH3 from Raflatac | 5 | 0 |
| Curl resistance at 60° C. and 2 d; hot-melt RH0T from Raflatac | 5 | 0 |
| Curl resistance at 60° C. and 2 d; hot-melt L1 945 from Artimelt | 5 | 0 |
| Curl resistance at 60° C. and 2 d; hot-melt L1 972N from Artimelt | 5 | 0 |
| Curl resistance at 60° C. and 2 d; hot-melt L1 927 from Artimelt | 5 | 0 |

Another curl resistance evaluation was carried out using a slightly modified protocol that was found to be at least as critical as the standard testing protocol applied during 5 days at 60° C. This second testing protocol differed from the standard one in that the samples coated with hot melts are stored at room temperature for minimum of 2 weeks before talc neutralization and aging in the oven. However, in this case, the oven temperature is set at 50° C. (instead of 60° C.) and the aging time is 24 hours. Results gathered in Table 4 are very similar to the previous ones.

TABLE 4

Curl-Resistance Evaluation with Various Hot-Melt Adhesives under Modified Protocol

| | 60LH538 | 60LH538 structure with PET primer |
|---|---|---|
| Curl resistance at 50° C. and 24 h; hot-melt S-2045 from Avery | 5 | 0 |
| Curl resistance at 50° C. and 24 h; hot-melt TT4 from Manter | 5 | 0 |
| Curl resistance at 50° C. and 24 h; hot-melt RH1 from Raflatac | 5 | 0 |
| Curl resistance at 50° C. and 24 h; hot-melt RH3 from Raflatac | 5 | 0 |
| Curl resistance at 50° C. and 24 h; hot-melt RH0T from Raflatac | 5 | 0 |

Blocking Properties: Test Under Accelerated Conditions

Small rolls were made on the pilot coating line, which simulates efficiently the process conditions of an industrial line and provides identical, or at the very least, very similar film properties. These rolls (320 mm wide) were stored for one week under tropical conditions (38° C./90% RH), and then unwound at 400 m/min without any issue (e.g., web break due to blocking). No severe blocking tendency was noticed even under these severe testing conditions. Performances, therefore, were in line with expectations.

Adhesive Adhesion Properties with Water-Based and Solvent-Based Adhesive

Interactions between back-side coating and different types of pressure-sensitive adhesives were evaluated. Samples were tested with proprietary blends of repositionable (shelfmarking) adhesive, permanent solvent- and water-based adhesive, removable adhesive and hot-melt adhesive.

The test method involved applying an adhesive to a release liner, followed by transfer-coating the test adhesive to the adhesive-receiving coated surface of the sample polymeric substrate to be evaluated. The adhesive coating usually desirable for the adhesive to remain with the face-stock after removal. It is also usually desirable for the adhesive to separate from the test surface without "stringing." Stringing describes the tendency for an adhesive to form elastic filaments or threads when the adhesive is separated from another surface.

TABLE 5

Peel Strength Values and Failure Mode

| SAMPLE DESCRIPTION | REPLI-CATE # | WHERE PERFORMED | ADHESIVE TYPE | PANEL TYPE | TIME (H) | PEELING SPEED (mm/min) | SAMPLE WIDTH (mm) | PSL PEELING STRENGTH AVERAGE (g/25 mm) | FAILURE MODE |
|---|---|---|---|---|---|---|---|---|---|
| 60ZH247/PET PR1550 0.36 gsm/Backside 60LH538 | 1 | BACKSIDE | A225 | METAL | 24 | 300 | 25 | 1139 | CLEAR PANEL |
| 60LH538 | 2 | BACKSIDE | A225 | METAL | 24 | 300 | 25 | 1407 | CLEAR PANEL |
| 65LL344A | 3 | BACKSIDE | A225 | METAL | 24 | 300 | 25 | 1450 | CLEAR PANEL |
| 60ZH247/PET PR1550 0.36 gsm/Backside 60LH538 | 1 | BACKSIDE | A245 | METAL | 24 | 300 | 25 | 860 | CLEAR PANEL |
| 60LH538 | 2 | BACKSIDE | A245 | METAL | 24 | 300 | 25 | 837 | CLEAR PANEL |
| 65LL344A | 3 | BACKSIDE | A245 | METAL | 24 | 300 | 25 | 798 | CLEAR PANEL |
| 60ZH247/PET PR1550 0.36 gsm/Backside 60LH538 | 1 | BACKSIDE | A184 | METAL | 24 | 300 | 25 | 2384 | 100% COHESIVE FAILURE |
| 60LH538 | 2 | BACKSIDE | A184 | METAL | 24 | 300 | 25 | 2226 | 100% COHESIVE FAILURE |
| 65LL344A | 3 | BACKSIDE | A184 | METAL | 24 | 300 | 25 | 2183 | 100% COHESIVE FAILURE |
| 60ZH247/PET PR1550 0.36 gsm/Backside 60LH538 | 1 | BACKSIDE | A225 | GLASS | 24 | 300 | 25 | 1064 | CLEAR PANEL |
| 60LH538 | 2 | BACKSIDE | A225 | GLASS | 24 | 300 | 25 | 1129 | CLEAR PANEL |
| 65LL344A | 3 | BACKSIDE | A225 | GLASS | 24 | 300 | 25 | 1060 | CLEAR PANEL |
| 60ZH247/PET PR1550 0.36 gsm/Backside 60LH538 | 1 | BACKSIDE | A245 | GLASS | 24 | 300 | 25 | 779 | CLEAR PANEL |
| 60LH538 | 2 | BACKSIDE | A245 | GLASS | 24 | 300 | 25 | 726 | CLEAR PANEL |
| 65LL344A | 3 | BACKSIDE | A245 | GLASS | 24 | 300 | 25 | 727 | CLEAR PANEL |
| 60ZH247/PET PR1550 0.36 gsm/Backside 60LH538 | 1 | BACKSIDE | A184 | GLASS | 24 | 300 | 25 | 2307 | 100% COHESIVE FAILURE |
| 60LH538 | 2 | BACKSIDE | A184 | GLASS | 24 | 300 | 25 | 2159 | 100% COHESIVE FAILURE |
| 65LL344A | 3 | BACKSIDE | A184 | GLASS | 24 | 300 | 25 | 2146 | 100% COHESIVE FAILURE | weight is typically about $20\pm1$ g/m$^2$. The testing protocol is based on the FINAT FTM 1 (Peel adhesion (1800) at 300 mm per minute).

Jindal Films' 60LH538 film is currently widely available on the commercial market for PSL and other applications, and its outstanding adhesive receptivity properties exists with most adhesives, including water- and solvent-based types. However, although no change was expected in terms on adhesive adhesion since the backside topcoat in contact with the adhesives was not changed in the modified version, the introduction of a new primer into the film structure might have affected the adhesive behavior, especially if the primer's anchorage onto the base film or with the backside topcoat is reduced. For this reason, a new series of tests were conducted to check the peeling strengths values and the failure modes.

A water- or solvent-based adhesive, coated sample is attached to a test surface, e.g., stainless steel or glass. After conditioning, i.e., waiting some time, such as twenty-four hours as done here, before measuring the peeling force, the peel force required to remove the sample label from the test surface is recorded and the mode of failure noted. It is Permanent, removable, water-based and solvent-based adhesives were applied on the backside coating (adhesive receptive layer) of standard films for PSL applications available in the grade range of Jindal Films' films, e.g., 60LH538 and 65LL344-A. As shown in Table 5, peel strengths values on glass and metal were measured at 180° and compared to the ones obtained on the modified 60LH538, i.e., a 60ZH247 base film with PR1550 primer and 60LH538 adhesive receptive topcoat. Aging time on glass and metal plate was set at 24 hours. Water-based adhesives supplied by BASF include Acronal 225 and 245. A solvent-based adhesive, i.e., Loctite Duro-Tak 184A, from Henkels was also tested. Globally, the peel strengths' values were very similar to other grades used in PSL applications. A slightly lower peeling strength value for the modified version was nevertheless noticed as compared to the other two grades when using Acronal 225 on glass plates. However, such a difference was not seen on metal plates. On the other hand, higher values were seen when using solvent-based adhesive from Henkels. This shows that such differences are not significant and might be due in some cases to the variability linked to the testing conditions.

In any case, the adhesive behavior was perfect. Indeed, no adhesive transfer was observed. In some cases, a cohesive failure was noticed. In the first case, the adhesive fully remains on the label after removal from the glass/metal plate, leaving the latter totally clean ("clean plate"). In the second case, and generally when the peeling strengths are much higher, e.g., above 2000 g/25 mm, the failure is observed within the adhesive layer, leaving both the full surface of the film and the glass/metal plates coated of adhesive. This tends to confirm that the affinity of the adhesives with the base film is quite strong and no weakness between the new primer and the base film and/or the topcoat.

Film Structure for Flexible Packaging

Any MOH from various sources should not accumulate in food and thereby have possible negative effects on human health. It is therefore obvious that materials intended for food contact, e.g., packaging films, must not be part of these contamination sources, which by the way could also deteriorate the organoleptic properties of the food. It is well known that uncoated bi-oriented polypropylene ("BOPP") films are not always good barrier layers to mineral oils; and, it is sometimes necessary to add a functional barrier layer to reduce or prevent the migration of some MOH contaminants from adhesives, equipment lubricants, recycled cardboards, and so forth. The location of the barrier layer can be either in the base film structure (e.g., ethylene vinyl alcohol co-extruded layer) or as a coated layer from water- or solvent-based coatings.

The effect of a polyester primer was also evaluated in film structures for flexible packaging applications. A series of samples were analyzed for their ability to act as functional barriers under typical food packaging contact and compliance test conditions at 40° C. The goal was therefore to investigate the permeation of MOH simulants through various film structures. Among these various film structures that we analyzed were a simple structure made of a 29 µm BOPP base film, i.e., 29MB210, which is commercially available from Jindal Films that was coated with a primer and an acrylic coating with moderate barrier properties to MOH. A second sample was produced in the same way, i.e., using the same base film and acrylic topcoat, but replacing the standard primer by the polyester dispersion PR1550 from Henkels at ~0.4 gr/m².

Only selected substances, considered as representative for mineral oils (or printing inks), were tested. MOSH, e.g., alkanes from $C_{14}$ to $C_{22}$, and MOAH simulants are shown in Table 6.

TABLE 6

Sample List of Some Substances That Are Mineral Oils

| Substance | CAS-Nr. | Formula | MW (g/mol) | mp (° C.) | bp (° C.) | density (g/ml) |
|---|---|---|---|---|---|---|
| C12 | 112-40-3 | $C_{12}H_{26}$ | 170.33 | −10 | 216 | 0.7487 |
| Naphthaline | 91-20-3 | $C_{10}H_8$ | 128.17 | 80 | 218 | 1.1400 |
| 1-Methylnaphthalin | 90-12-0 | $C_{11}H_{10}$ | 142.20 | −31 | 245 | 1.0200 |
| C14 | 629-59-4 | $C_{14}H_{30}$ | 198.39 | 6 | 254 | 0.7628 |
| 1-Ethylnaphthalin | 1127-76-0 | $C_{12}H_{12}$ | 156.22 | −15 | 260 | 1.0080 |
| 2,7-Diisopropylnaphthalin | 40458-98-8 | $C_{16}H_{34}$ | 226.44 | | | 0.7733 |
| Iso-Propyllaurat | 10233-13-3 | $C_{15}H_{30}O_2$ | 242.40 | −5 | 281 | 0.865 |
| C16 | 544-76-3 | $C_{13}H_{10}O$ | 182.22 | 18 | 287 | 1.1100 |
| Benzophenone | 119-61-9 | $C_{16}H_{20}$ | 212.33 | 48 | 305 | 0.9500 |
| C18 | 593-45-3 | $C_{18}H_{38}$ | 254.49 | 28 | 316 | 0.7768 |
| 4-Methylbenzophenone | 134-84-9 | $C_{14}H_{12}O$ | 196.25 | 55 | 326 | 1.0800 |
| Phenanthren | 85-01-8 | $C_{14}H_{10}$ | 178.23 | 99 | 332 | 1.0630 |
| C20 | 112-95-8 | $C_{20}H_{42}$ | 282.55 | 37 | 343 | 0.7886 |
| C22 | 629-97-0 | $C_{22}H_{46}$ | 310.60 | 44 | 369 | 0.7944 |
| C24 | 646-31-1 | $C_{24}H_{50}$ | 338.65 | 54 | 391 | 0.7665 |

MW: molecular weight,
mp: melting point,
bp: boiling point

The films were placed in special permeation cells and stored at a selected temperature. In the lower side of the cells, a contaminated cardboard was placed. The tested films had direct contact with the contaminated cardboard. The other side of the cells was rinsed with pure nitrogen. The nitrogen flow moved the permeated substances out of the cell. The nitrogen stream was analyzed for the substances by using a 16-position valve that passes the gas stream of each cell in sequence to a pre-trap with a connected enrichment unit and gas chromatograph with flame ionization detection (GC/FID). Calibration was performed with injections of known amounts of the substances.

Gas Chromatoraphic Conditions

Gas chromatographic column: Rxi-5 ms column type; length: 30 m; internal diameter: 0.25 mm; film thickness: 0.5 µm; carrier gas: 1.3 ml/min Helium (const. flow); temperature program: 120° C.; hold 2 min>10°/min>180° C.>20°/min.>320° C. hold 4 min. (total ~20 minutes)

Pre-trap: substances collected at room temperature on 20 mm length by 5 mm diameter Tenax, desorbed at 350° C.

Main trap: substances focused at −45° C. on 20 mm length by 1.4 mm diameter of tenax, desorbed at 350° C.

For contaminating the cardboard, a 100-ppm solution of the substances in diethyl ether was prepared. A disk with 15.4 cm in diameter (5.5 g) of the cardboard was soaked with 4 mL of this solution. After drying of the diethyl ether, a concentration of ~73 ppm per substance resulted in the cardboard.

The following table shows the exact amount of each substance (simulant) in the contaminated cardboard:

TABLE 7

Exact Amount of the Substances Representative for Mineral Oils

| Substance | 100 ppm mix (ppm) (ng/µl) | 4 ml on 5.5 g (µg/g) (ppm) |
|---|---|---|
| 1-Methylnaphthalin | 102 | 74 |
| 1-Ethylnaphthalin | 102 | 73 |

TABLE 7-continued

Exact Amount of the Substances Representative for Mineral Oils

| Substance | 100 ppm mix (ppm) (ng/µl) | 4 ml on 5.5 g (µg/g) (ppm) |
|---|---|---|
| Iso-Propyllaurat | 99 | 72 |
| Benzophenone | 102 | 74 |
| 2,7-Diisopropylnaphthalin | 104 | 75 |
| 4-Methylbenzophenone | 100 | 72 |
| Phenanthren | 101 | 73 |
| C12 | | |
| C14 | 102 | 74 |
| C16 | 101 | 73 |
| C18 | 100 | 72 |
| C20 | 101 | 73 |
| C22 | 101 | 73 |

The following table shows the different permeation rates of the tested barrier samples at 40° C. after 40 days in µg/day*dm². Amounts are averages from day 35 to day 40. The limit of detection is generally around 0.002 to 0.004 µg/day*dm². Some of the values observed are clearly at or below that limit. For example, permeation rates of methylnaphthalene, benzophenone, $C_{20}$ and $C_{22}$ in the polyester primer-based structure are in that case. The control is also below the limit of detection when $C_{22}$ is used. From Table 8, it also appears that the permeation rates are generally divided by ~15 to 35 times when a polyester primer is used. The only exceptions were observed with benzophenone and methylbenzophenone; however, the level of permeation is extremely small in these cases and below or close to the limit of detection.

TABLE 8

Permeation Rates at Equilibrium

| (µg/d*dm²) | Methylnaph-thalene | $C_{14}$ | Ethylnaph-thalene | $C_{16}$ | Isopropyl laurate | Benzo-phenone | 2,7-DIPN | Methyl benzo-phenone | $C_{18}$ | Phenan-threne | $C_{20}$ | $C_{22}$ |
|---|---|---|---|---|---|---|---|---|---|---|---|---|
| Control (29MB210/ standard primer/ Standard acrylic coating | 0.053 | 1.445 | 0.147 | 1.685 | 0.425 | 0.000 | 0.341 | 0.007 | 0.656 | 0.636 | 0.078 | 0.000 |
| Control (29MB210/ Polyester primer/ Standard acrylic coating | 0.002 | 0.099 | 0.005 | 0.075 | 0.013 | 0.001 | 0.013 | 0.011 | 0.019 | 0.018 | 0.003 | 0.000 |
| Ratio Variable/ Control | 26.354 | 14.654 | 30.355 | 22.376 | 33.282 | 0.571 | 25.807 | 0.624 | 34.775 | 34.775 | 24.141 | — |

Below are further example embodiments of this disclosure presented in claim format:
1. A curl-resistant composition comprising:
   a polymeric substrate having a first side and a second side;
   a printable coating layer on the first side;
   an adhesive-receptive layer on the second side; and
   a barrier layer to mineral-oil migration, wherein the barrier layer is located between the adhesive-receptive layer and the polymeric substrate, and wherein the barrier layer consists essentially of: (i) polymers of polyvinyl alcohol, ethylene vinyl alcohol, polyester, polyamide, or combinations thereof; and (ii) optionally additives;
   wherein the barrier layer provides a barrier to mineral-oil migration of 0.1 µg/day*dm² or less at 40° C. for 40 days, and
   wherein the curl-resistant composition does not curl when heated for at least one hour at 60° C.
2. The curl-resistant composition of claim 1, where the barrier layer is a primer.
3. The curl-resistant composition of claim 1, where the barrier layer is a coextruded layer.
4. The curl-resistant composition of claim 1, further comprising a second primer layer between the polymeric substrate and the printable coating layer.
5. The curl-resistant composition of claim 4, wherein the second primer layer has a same composition as the barrier layer.
6. The curl-resistant composition of claim 4, wherein the second primer layer has a different composition as the barrier layer.
7. The curl-resistant composition of claim 2, wherein the primer is water-based.
8. The curl-resistant composition of claim 2, wherein the primer is solvent-based.
9. The curl-resistant composition of claim 1, wherein the polymeric substrate is biaxially oriented.
10. The curl-resistant composition of claim 1, wherein the polymeric substrate comprises polypropylene.
11. The curl-resistant composition of claim 1, further comprising additives.
12. The curl-resistant composition of claim 1, further comprising an adhesive coating on the adhesive-receptive layer.
13. The curl-resistant composition of claim 12, wherein the adhesive coating is water-based.
14. The curl-resistant composition of claim 12, wherein the adhesive coating is solvent-based.
15. The curl-resistant composition of claim 12, wherein the adhesive coating is a hot-melt adhesive composition.
16. The curl-resistant composition of claim 12, having a peel strength on glass or metal of at least 700 g/25 mm at 180°.
17. The curl-resistant composition of claim 1, wherein the polymeric substrate comprises polypropylene.
18. The curl-resistant composition of claim 1, wherein the barrier layer is a dispersion.
19. The curl-resistant composition of claim 1, wherein the barrier layer is a solution.

What is claimed is:
1. A curl-resistant composition comprising:
   a polymeric substrate having a first side and a second side;
   a printable coating layer on the first side;
   an adhesive-receptive coating layer on the second side, wherein the adhesive-receptive coating layer comprises acrylic polymer; and
   a barrier layer to mineral-oil migration, wherein the barrier layer is located directly between and on the adhesive-receptive coating layer and the polymeric substrate, and wherein the barrier layer consists essentially of: (i) polymers of polyvinyl alcohol, ethylene vinyl alcohol, polyester, polyamide, or combinations thereof; and (ii) optionally additives;

wherein there is no adhesive transfer between a glass or metal plate and the adhesive-receptive coating layer when peeling the curl-resistant composition from the glass or metal plate at 180 degrees at 24 hours from adhesion at a peeling speed of 300 mm/min and peel strength at or below 1450 g/25 mm regardless of whether the adhesive-receptive coating layer is water-based or solvent-based;

wherein the barrier layer provides a barrier to mineral-oil migration of 0.1 μg/day*dm$^2$ or less at 40° C. for 40 days, and wherein the curl-resistant composition does not curl when heated for at least one hour at 60° C.

2. The curl-resistant composition of claim 1, where the barrier layer is a coextruded layer.

3. The curl-resistant composition of claim 1, wherein the polymeric substrate is biaxially oriented.

4. The curl-resistant composition of claim 1, wherein the polymeric substrate comprises polypropylene.

5. The curl-resistant composition of claim 1, further comprising additives.

6. The curl-resistant composition of claim 1, wherein the adhesive-receptive coating layer is water-based.

7. The curl-resistant composition of claim 1, wherein the adhesive-receptive coating layer is solvent-based.

8. The curl-resistant composition of claim 1, wherein the adhesive-receptive coating layer is a hot-melt adhesive composition.

9. The curl-resistant composition of claim 1, wherein the peel strength is at least 700 g/25 mm.

10. The curl-resistant composition of claim 1, wherein the barrier layer is a dispersion.

11. The curl-resistant composition of claim 1, wherein the barrier layer is a solution.

12. The curl-resistant composition of claim 1, wherein the barrier layer consists essentially of: (i) polymers of polyvinyl alcohol, ethylene vinyl alcohol, or combinations thereof; and (ii) optionally additives.

13. The curl-resistant composition of claim 1, wherein the adhesive-receptive coating layer further comprises ethylene polymer.

14. The curl-resistant composition of claim 1, where the barrier layer is a primer.

15. The curl-resistant composition of claim 14, wherein the primer is water-based.

16. The curl-resistant composition of claim 14, wherein the primer is solvent-based.

17. The curl-resistant composition of claim 1, further comprising a second primer layer between the polymeric substrate and the printable coating layer.

18. The curl-resistant composition of claim 17, wherein the second primer layer has a same composition as the barrier layer.

19. The curl-resistant composition of claim 17, wherein the second primer layer has a different composition as the barrier layer.

* * * * *